US007809608B2

(12) United States Patent
Kassan

(10) Patent No.: US 7,809,608 B2
(45) Date of Patent: *Oct. 5, 2010

(54) SYSTEM AND METHOD TO PREVENT TERMINATION OF ON-LINE TRANSACTIONS

(76) Inventor: Peter Kassan, 16 Atilda Ave., Dobbs Ferry, NY (US) 10522

( * ) Notice: Subject to any disclaimer, the term of this patent is extended or adjusted under 35 U.S.C. 154(b) by 0 days.

This patent is subject to a terminal disclaimer.

(21) Appl. No.: 11/214,516

(22) Filed: Aug. 30, 2005

(65) Prior Publication Data

US 2005/0283408 A1    Dec. 22, 2005

Related U.S. Application Data

(63) Continuation-in-part of application No. 10/703,616, filed on Nov. 6, 2003, now Pat. No. 7,225,148.

(60) Provisional application No. 60/490,127, filed on Jul. 25, 2003, provisional application No. 60/498,371, filed on Aug. 26, 2003, provisional application No. 60/505,080, filed on Sep. 22, 2003, provisional application No. 60/629,038, filed on Nov. 18, 2004.

(51) Int. Cl.
*G06Q 30/00* (2006.01)
(52) U.S. Cl. .............. 705/26; 705/14; 705/27; 705/72
(58) Field of Classification Search .......... 705/1, 705/2, 14, 26, 27, 51, 72; 713/182
See application file for complete search history.

(56) References Cited

U.S. PATENT DOCUMENTS

| 6,601,057 | B1 | 7/2003 | Underwood et al. | |
| 6,965,871 | B1* | 11/2005 | Szabo et al. | 705/26 |
| 2001/0053998 | A1* | 12/2001 | Kohda et al. | 705/14 |
| 2001/0056405 | A1 | 12/2001 | Muyres et al. | |
| 2002/0055878 | A1 | 5/2002 | Burton et al. | |
| 2002/0062245 | A1 | 5/2002 | Niu et al. | |
| 2002/0072980 | A1 | 6/2002 | Dutta | |
| 2002/0077929 | A1 | 6/2002 | Knorr et al. | |
| 2002/0128925 | A1 | 9/2002 | Angeles | |
| 2002/0165732 | A1* | 11/2002 | Ezzeddine et al. | 705/2 |
| 2002/0186255 | A1 | 12/2002 | Shafron et al. | |

(Continued)

FOREIGN PATENT DOCUMENTS

JP    2001-243178    9/2001

(Continued)

OTHER PUBLICATIONS

Cotlier, "Adieu to Abandoned Carts," *Catalog Age*, [Online] vol. 18, No. 11, Oct. 2001, pp. 39-42, XP002984546.

(Continued)

*Primary Examiner*—Yogesh C Garg

(57) ABSTRACT

A system and method is disclosed for preventing termination of an on-line transaction. In the system, a communication session between an Internet web site and a user terminal over a communication network is provided and a transaction initiating module receives a request from a user of the user terminal to initiate an on-line transaction. A signal receiving module receives a signal after the user attempts to terminate the communication session and prior to the user completing the on-line transaction, and a notification providing module provides a notification to the user after the signal is received.

32 Claims, 13 Drawing Sheets

U.S. PATENT DOCUMENTS

| | | | |
|---|---|---|---|
| 2003/0005046 A1 | 1/2003 | Kavanagh et al. | |
| 2003/0053615 A1 | 3/2003 | Anderson et al. | |
| 2003/0065577 A1 | 4/2003 | Haynes et al. | |
| 2003/0140140 A1 | 7/2003 | Lahtinen | |
| 2003/0144925 A1 | 7/2003 | Greenberg | |
| 2003/0158816 A1* | 8/2003 | Rouse | 705/51 |
| 2004/0098747 A1 | 5/2004 | Kay et al. | |
| 2005/0120221 A1* | 6/2005 | Arnold et al. | 713/182 |
| 2005/0165616 A1* | 7/2005 | Ellis et al. | 705/1 |
| 2008/0109373 A1* | 5/2008 | Eubanks | 705/72 |

FOREIGN PATENT DOCUMENTS

WO      WO 02/37384 A2      5/2002

OTHER PUBLICATIONS

YOUResponse: Internet Archive Wayback Machiine, www.archive.org; www.youresponse.com; Feb. 21, 2001, Apr. 1, 2001, 8 pgs.

YOUResponse: "Businesses Look to Help in Monitoring Shopping Cart Abandonment; YOUResponse . . . to offer support," PR Newswire, Jan. 25, 2001, Proquest ID #67284048, 3 pgs.

Maravilla, "The Case of the Abandoned Shopping Carts," PowerHomeBiz.com, vol. 13, pp. 1-3.

Kemp et al., "Customer Still Doesn't Come First," *Internet Week*, Sep. 29, 2000, pp. 1-3.

Robinson, "The Customer Service Ticking Clock," CRM Daily, May 7, 2002, pp. 1-4.

"Abandoned Shopping Carts," support.sales.cart.com, p. 1.

Whitman, "Increase Sales and Avoid Abandoned Shopping Carts," *Microsoft bCentral*, pp. 1-3.

Bayan, "Prevent Online Purchase Failures," *News Center*, The Write Edge, Apr. 2000, pp. 1-4.

"Shopping Carts Litter Internet," *Silicon Valley/San Jose Business Journal*, Nov. 8, 2000, pp. 1-2.

European Search Report for EP 0475792 dated Jan. 30, 2008.

International Search Report for PCT/US2004/15840 mailed on Jan. 27, 2005.

International Search Report for PCT/US2005/40760 mailed on Jan. 4, 2007.

Written Opinion for PCT/US2004/15840 mailed on Jan. 27, 2005.

Written Opinion for PCT/US2005/40760 mailed on Jan. 4, 2007.

Office Action for Chinese Application 200480026363.7, issued Aug. 21, 2009, with English translation.

Communication for EP Application 04 752 792.4, mailed Nov. 25, 2009.

Second Office Action on Chinese Application 200480026363.7, mailed Mar. 18, 2010 (English translation included).

Office Action on Japanese Application 2006-521815, mailed May 20, 2010 (with English translation).

* cited by examiner

FIG. 2B

YOU HAVE NOT COMPLETED MAKING YOUR TAX PAYMENT!

MAKE YOUR ON-LINE TAX PAYMENT HERE. ALL MAJOR CREDIT CARDS ACCEPTED

SOCIAL SECURITY NUMBER: 025-00-1002 — 2A02

FOR TAX PERIOD(S): JANUARY 1, 2004–DECEMBER 31, 2004    AMOUNT OWED: $1,200.34 — 2A04

AMOUNT DUE

CURRENT PAYMENT: — 2A06

PROCEED TO CHECKOUT — 2A08

200

PLEASE COMPLETE YOUR TRANSACTION AND CLICK "PROCEED TO CHECKOUT"

OR

SELECT A CHOICE BELOW

○ LET ME GO – NEVER BOTHER ME AGAIN!

○ LET ME GO – SEND ME AN E-MAIL REMINDER WITH A LINK TO THIS SITE IN ONE WEEK

FIG. 5A

HTTP://WWW.NATIONALGARDENCLUB.COM

WE PROVIDE GARDENING TECHNIQUES TO
PEOPLE AROUND THE WORLD.
THANK YOU FOR VISITING OUR SITE!
SUBSCRIBE TO OUR MAGAZINE:

NAME:
ADDRESS:
TELEPHONE:
EMAIL:

— 5A02

○ THREE MONTH SUBSCRIPTION
● SIX MONTH SUBSCRIPTION
○ NINE MONTH SUBSCRIPTION
○ ONE YEAR SUBSCRIPTION

SELECT BELOW FROM OUR POPULAR PUBLICATIONS
☒ ADVANCED PERENNIALS-FROM JANUARY TO DECEMBER
☐ SHRUBBERY IN SHADED AREAS
☒ DEALING WITH EXCESSIVE SUNLIGHT
☒ BUILDING THAT SPECIAL COMPOST
☐ MAKING A TERRACE WORK FOR YOU

PROCEED TO CHECKOUT — 2A08

FIG. 5B

SYSTEM AND METHOD TO PREVENT TERMINATION OF ON-LINE TRANSACTIONS

CROSS-REFERENCE TO RELATED APPLICATIONS

The present invention is a continuation-in-part, is based on and claims priority to U.S. patent application Ser. No. 10/703,616, filed Nov. 6, 2003, and entitled IMPROVED E-COMMERCE SHOPPING CART, which claims priority to U.S. Provisional Patent Application Ser. Nos. 60/490,127, filed Jul. 25, 2003, 60/498,371, filed Aug. 26, 2003, 60/505,080, filed Sep. 22, 2003, all entitled "IMPROVED E-COMMERCE SHOPPING CART," and the present application further is based on and claims priority to 60/629,038, filed Nov. 18, 2004, entitled "IMPROVED E-COMMERCE SHOPPING CART," the entire contents of all of which are incorporated herein by reference.

FIELD OF THE INVENTION

The present invention relates to on-line transactions, and, more particularly, to interrupting an attempt by a web site visitor to terminate a communication session with an Internet web site prior to completing any kind of on-line transaction.

BACKGROUND OF THE INVENTION

Thousands of Internet web sites provide for various kinds of on-line transactions. In addition to so-called "e-commerce" web sites that offer goods and/or services for sale, many Internet web sites provide a host of on-line transactions directly over the World Wide Web that are not necessarily related to purchases. For example, some web sites disseminate information, some web sites provide various forms of multimedia content, and others provide computer software to visitors. A myriad of other kinds of transactional Internet web sites are publicly available and known to those skilled in the art.

In a typical transactional Internet web site, one or more hyperlinks are formatted as text and/or graphic controls (e.g., buttons, drop-down lists, check boxes, text boxes, images or the like) that enable users to indicate an interest in transacting with the proprietor of the web site. For example, a visitor to a web site selects an item of interest and is provided information about the item. Once the visitor selects a graphical screen control, such as a button labeled "proceed to checkout," the web site enables the visitor to complete the on-line transaction with the newly added item.

Continuing with the present example, at this point the visitor has several choices available to him. For example, the visitor can select a control, such as a checkout button, which typically provides a display screen that prompts the visitor to submit delivery or payment information required to complete the on-line transaction. Alternatively, the visitor can continue to select more items of interest. Also, the visitor can amend the contents of an e-commerce shopping cart by removing items that are provided therein, or can change quantities of items already placed in a shopping cart.

A shortcoming in the prior art exists because a visitor who initiates an on-line transaction with a web site is simply able to terminate the on-line session, for example, by closing the web browser application. In most Windows-based web browser software applications, a visitor can select the X button in the top right portion of the windowed screen to terminate a communication session with a web site. Alternatively, the visitor can select File from a menu, and then select Exit from the File sub-menu. Moreover, a user of Windows-based web browser software can effectively terminate on-line session with an e-commerce web site by pressing the ALT key and F4 key simultaneously, or by pressing the CTRL key and the F4 key simultaneously. Further, a user can click a mouse button over an icon representation in the WINDOWS TASKBAR and select a menu choice, such as "Close," from a respective menu. Still another method to terminate an on-line session involves simply navigating or "surfing" to another web site.

For example, a visitor can enter a uniform resource locator ("URL") in an address bar in a web browser software application for a different web site in a browser address bar and be presented with a different web site, thereby terminating the communication session with the proprietor's web site. Alternatively, a hyperlink to another web site may be provided in the proprietor's web site, thereby enabling the visitor to terminate his session with the web site and begin a new session with the web site identified in the hyperlink.

Thus, there are many ways for an on-line shopping session to terminate prior to the completion of an on-line transaction.

SUMMARY OF THE INVENTION

The present invention improves upon prior art Internet web sites by providing a system and method that prevents termination of a communication session prior to completion of an on-line transaction.

Preferably, the present invention includes a user terminal that communicates with an Internet web site over a network. A request is received from the user terminal that initiates some form of on-line transaction. For example, a request for information regarding an item represents an on-line transaction. The present invention monitors for any event that represents the user of the terminal attempting to terminate the communication session and, accordingly, prevents the communication session from terminating prior to completion of the on-line transaction. A notification is preferably provided to the user terminal during the communication session that represents the web site acknowledging the user's attempt to terminate the communication session, and the notification provides the user operating the terminal with another opportunity to complete the on-line transaction. The notification can be formatted as a modified version of a web page of the web site, or can be formatted in various other ways, such as a pop up screen.

In a preferred embodiment of the present invention, when the notification is provided to the user, the user can complete the transaction by submitting information required to complete the transaction. It is desirable to provide a system and method whereby a visitor to the web site is substantially automatically prompted to complete the transaction (not necessarily sales) after the visitor attempts to terminate the on-line session prior to completing the transaction.

It is further desirable to provide a system and method whereby a visitor to an Internet web site is substantially automatically prompted to submit an electronic questionnaire in the event the visitor attempts to terminate a communication session with the web site prior to completing an on-line transaction.

It is still further desirable to provide a system and method whereby a visitor is provided a coupon or other certificate that is redeemable for goods, services or other value after responding to and submitting the above-described questionnaire.

Thus, in case an on-line transaction is initiated and an attempt to terminate the transaction occurs prior to completion, the cancellation is interrupted and the visitor is afforded another opportunity to complete the transaction, preferably without any further processing steps.

Other features and advantages of the present invention will become apparent from the following description of the invention which refers to the accompanying drawings.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIGS. 2A-6 illustrate the example embodiments of the present invention in which a transaction prompt is automatically provided;

DETAILED DESCRIPTION OF THE PREFERRED EMBODIMENTS OF THE INVENTION

Figure 1:
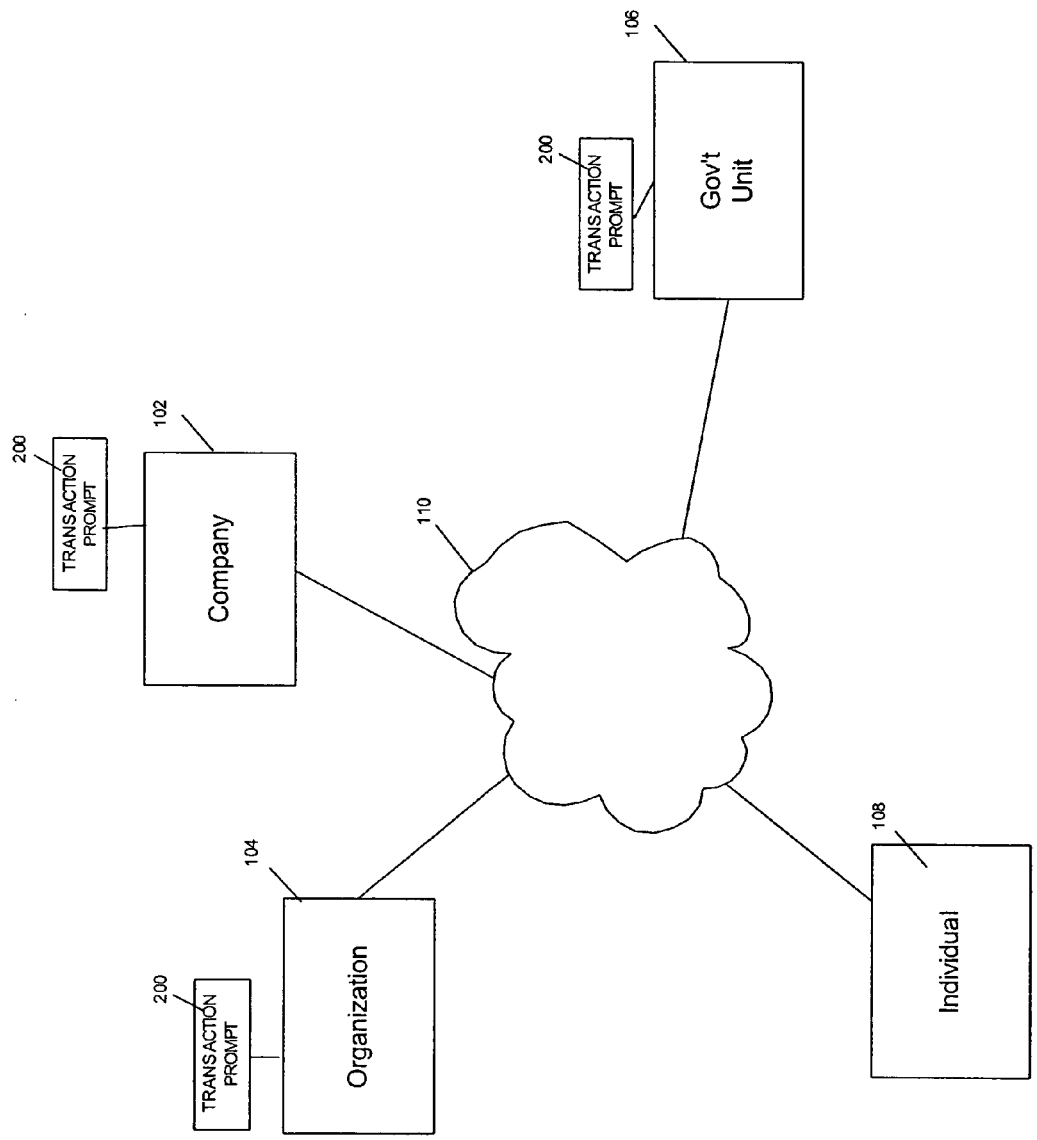
FIG. 1 is a block diagram that represents parties associated with the present invention.

The present invention preferably monitors a visitor's actions in a web site, such as keystroke and mouse-click actions and, after receiving a signal that represents an attempt to terminate the communication session between a visitor and the web site prior to completing an on-line transaction. The visitor is prompted to complete the transaction and/or to respond to one or more prompts in a display screen.

As used herein, a "visitor" refers, generally, to a user operating a web-enabled user terminal and who has engaged in, is engaged in, or will engage in an "on-line" communication session (referred herein, generally, as a "visit"), typically via standard web browser software, with an hypertext transport protocol ("HTTP") server providing an Internet web site. Also as used herein, the term, "module," refers, generally, to one or more discrete components that contribute to the effectiveness of the present invention. Modules can include software elements, including but not limited to functions, algorithms, objects and the like. Modules can also include hardware elements, substantially for performing the steps or contributing to the performance of steps associated with the present invention. Modules can operate independently or, alternatively, can depend upon one or more other modules in order to function.

In accordance with the present invention, when a visitor visits a web site by establishing an on-line session therewith, and thereafter desires to terminate the session, a subsequent display screen is preferably presented to the visitor. For example, a modified version of a web site can be provided when a visitor to a web site attempts to terminate a communication session therewith prior to completing an on-line transaction. Alternatively, a new pop-up display screen can be provided in the user's browser that the visitor has attempted to close.

In a preferred embodiment, the present invention monitors a visitor's selections made during an on-line session with a web site that is operable to provide an on-line transaction. For example, a visitor to an Internet web site navigates through one or more display screens to register a newly-purchased software application to receive free periodic updates and regularly e-mailed information. To register the software, the visitor enters an appropriate URL in his browser application, and, once connected to the site, selects a graphic icon representing a choice to register the software. The user, thereafter, has the ability to complete the on-line transaction and register his software with the web site. When a command is received from the visitor that would otherwise result in terminating the communication session, the visitor is preferably prompted to complete the transaction and/or respond to one or more prompts in a display screen. In an alternative embodiment, the present invention preferably determines whether any related browser sessions are active. In the event that a related browser session is active (i.e., representing that the communication session would not terminate), then the user's actions are preferably not interrupted.

Thus, the present invention is directed to preventing the interruption and/or termination of an online transaction between a web site visitor and an Internet web site. An incomplete transaction, such as frequently occurs in the prior art, results when a web site visitor accesses a web site on which an online transaction can begin, but then closes the browser session with the web site without providing sufficient information, authorization (or both) in order to allow the proprietor of the web site to provide the product and/or service.

As used herein, an "online transaction" refers to, generally, any interaction between a web site visitor and a web site that results in the entity, for example, a company, organization, governmental unit or individual associated with the web site, to have the authorization and/or sufficient information to provide a service or product to, for, and/or on behalf of the web site visitor.

As used herein, an "online transaction" further may include, for example, displaying a depiction and/or description of an item that is available for purchase that includes, optionally, an "Add To Shopping Cart" button, or the like. As described in co-pending U.S. patent application Ser. No. 10/703,616, many e-commerce transactions occur only after a user browses, typically by viewing images of, a merchant's inventory and thereafter selects an item to be placed in an e-commerce shopping cart. In accordance with the present invention and as noted above, an "online transaction" is to be construed more broadly, and includes any interaction between a web site visitor and a web site, such that the proprietor of the web site is able to provide a product or service on behalf of the visitor. Thus, the present invention is not limited to e-commerce transactions, and encompasses any on-line transaction. As described in detail below, the present invention is applicable to any service, product or transaction (not necessarily commercial in nature) that can be ordered, requested and/or provided over the Internet. Other features and methods of the invention are described in greater detail below.

In accordance with the present invention, an online transaction occurs when a web site visitor who is accessing a web page, for example, via standard Internet web browser software, makes a selection that enables the proprietor of the web site to provide a service and/or product for the visitor. In other words, a visitor who merely establishes a communication (e.g., HTTP) session with a web site home page is not sufficient to invoke the processes described herein. However, once the user makes a selection that enables the proprietor of the web site to provide such a service or good, then an online transaction has begun.

As should be readily apparent to one skilled in the art, the functionality of the invention extends beyond typical prior art e-commerce financial transactions. For example, and as described in greater detail below, the present invention is applicable for a wide variety of transactions, such as for making online tax payments and/or charitable donations, sending electronic greeting cards and many other kinds of transactions not necessarily related to purchasing a good or service over the Internet.

In accordance with the present invention, a situation is provided in which a web site visitor attempts to close a browser session, and doing so would result in an incomplete online transaction. The present invention preferably detects such an attempt and, in either a new browser window or in the same browser window, displays a modified form to enable collecting information necessary to continue or complete the online transaction. The form may include some notice or indication that the online transaction is incomplete, may display all or some of the information that had been displayed during the online transaction (including choices the web site visitor had made, if any), and further may display any other information the web site visitor submitted or otherwise provided.

In the event that a web site visitor performs some action that would result in an incomplete transaction (e.g., attempts to close the Internet web browser software application), a variety of responsive actions are envisioned herein that are provided by the web site. For example, a notice is simply displayed to the visitor that the transaction was incomplete. Alternatively, all of the information that had been displayed in the visitor's web browser display screen(s), including choices the web site visitor had made, are displayed. Other options may be provided, such as a means to continue or complete a transaction normally.

Alternatively, some action may be automatically performed, such as closing a browser window without performing any further processing or interference. Alternatively, the present invention may send an e-mail reminder at a designated time, optionally including a link enabling the visitor to return to the web site with various choices and information previously provided by the visitor automatically inserted. Another option is a request to have the user answer a questionnaire regarding the reasons for the visitor attempting to abort the transaction, optionally with an inducement, such as a discount or other offer. Further, an offer to display similar items that are available at lower prices can be displayed and/or provided to the visitor automatically.

In accordance with the present invention, and in addition to the options described above, a user is preferably provided with a display (either in the same browser display screen or a different one) enabling the visitor to choose to continue or otherwise complete the online transaction. This feature supplants or is an effective substitute for a simple display of a window that asks or prompts the visitor to complete the online transaction, followed by second display of a window enabling the visitor to do so. In other words, after a user attempts to abort a transaction, a data entry form is displayed that enables the user to submit choices and/or responses related to the transaction that were provided prior to being interrupted.

In some case, a web site visitor may open several web browser display screens (e.g., windows) concurrently for displaying different pages, even from pages originating from the same web site. Optionally, the present invention does not invoke transaction prompt 200 until the user attempts to close the last of such display screens. In this way, transaction prompt 200 may not duplicate the information provided in the last window that the visitor attempted to close, but may instead display more appropriate and/or relevant and related information. Alternatively, transaction prompt 200 is not displayed prematurely before the visitor has attempted to terminate a transaction. For example, if a visitor has one web browser display screen displaying a product information page, and another web browser window displaying a web form operable to receive content from the user to enable the user to register a software product, and then the user first closes the data entry from and then attempts to close the window displaying the product information page, the invention preferably displays a modified (or the same) version of the data entry form, and not product information page. Moreover, if the user has opened a plurality of web browser display screens, and, thereafter, attempts to close all of the display screens (one after another) that are communicating with the web site, the present invention recognizes which action would result in terminating the online transaction. If, for example, an online transaction is presented in a sequence of web pages, the present invention preferably displays transaction prompt 200 to include information from the last page in the sequence. Transaction prompt 200 may include, for example, a summary of the information that the visitor had provided, or choices the visitor made on previous pages, or both. If the online transaction is completeable on a single web page, then transaction prompt 200 preferably displays a modified form of that web page.

In some cases, a transaction may include a visitor clicking on a single icon, such as "I AGREE" or "BUY IT NOW." In such case, the display of the page without the visitor clicking on the item is (optionally) considered an incomplete transaction herein.

In certain contexts, the last item that is reviewed by the visitor is the one that is displayed in transaction prompt 200. If, for example, transaction prompt 200 is displayed as a pop up screen, options are provided to enable the user to purchase the good or service, purchase similar, less expensive goods, a choice to stop pestering the user, a choice to provide a questionnaire, discounts and/or coupons. Alternatively, the web site determines which of the above options are displayed.

Thus, the functionality of the present invention is not invoked when a user merely attempts to closes a window, like a pop up window showing a picture of an item, unless closing the window would result in terminating the online transaction, even if the last window only happens to be one at such pop ups. Preferably, the present invention is operable when the visitor opens multiple web browser display screens, however, transaction prompt 200 is only provided when the user closes the last open web browser display screen from a particular site.

Thus, even if a user has not put any items into an e-commerce shopping cart, or subsequently removes items from a cart (updates quantities and/or removes items), transaction prompt 200 is provided. Further, the present invention displays transaction prompt 200 if a user presses "CANCEL ORDER" or similar graphic screen control at any stage during the process. Further, by selecting a command to close a web browser display screen, such as clicking the X button in a MICROSOFT WINDOWS environment, or by selecting some keystroke combination (such as CNTRL+F4 or ALT+F4) transaction prompt 200 is displayed.

Moreover, the present invention preferably displays a "sensible" last screen. For example, if a user has removed an item from an e-commerce shopping cart, the present invention does not display the item that was just removed from the shopping cart. Instead, for example, the last item viewed is displayed, possibly along with other appropriate options.

Referring now to the drawings, in which like reference numerals refer to like elements, FIG. 1 shows a block diagram that represents parties associated with the present invention. As shown in FIG. 1, company 102, organization 104, government unit 106 and individual 108 communicate over communication network 110 in order to avail themselves of web site functionality. Communication network 110 is preferably a global communication network, such as the Internet. As shown in FIG. 1, transaction prompt 200 is preferably provided by company 102, organization 104, and/or government unit 106. Of course, the parties represented in FIG. 1 are shown only for purposes of illustration, and do not limit the invention in any way. Some examples of these and other parties that are envisioned herein are shown with reference to FIGS. 2A-6.

FIGS. 2A-6 illustrate example embodiments of the present invention in which the transaction prompt 200 is automatically provided.

Figure 2A:
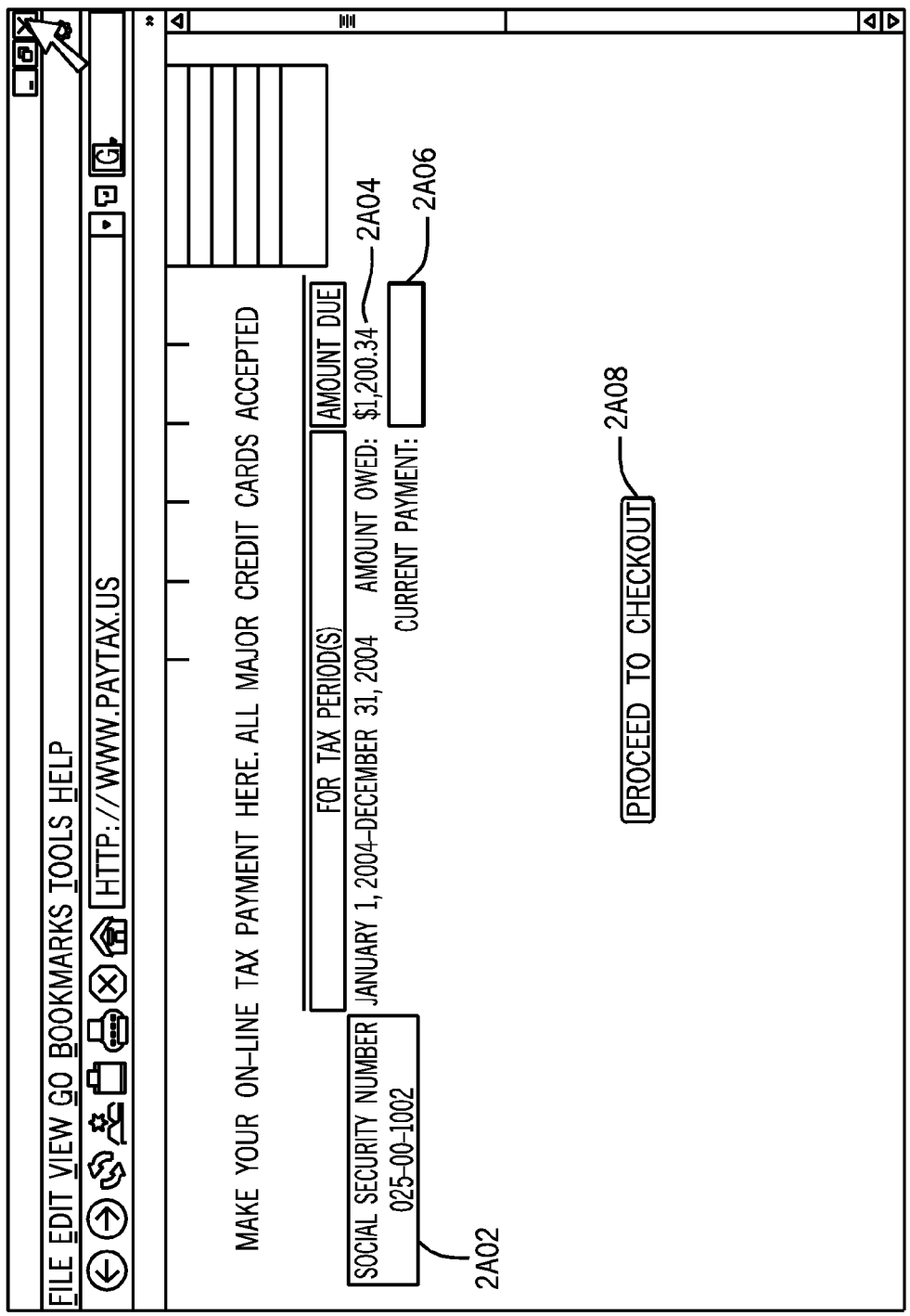

FIG. 2A illustrates an example embodiment of the present invention in which a web site directed to online tax payments is displayed. Thus, the online transaction displayed in FIG. 2A is a tax payment. In the example display screen shown in FIG. 2A, the web site visitor's social security number is displayed in identifier 2A02, the tax period, and the amount of tax that is owed is displayed in graphic screen control 2A04. The current amount the web site visitor is paying is displayed in graphic control 2A06. The user selects Proceed to Checkout button 2A08 to submit the amount and complete the payment.

As shown in the upper right hand corner of FIG. 2A, the user has moved his pointer device (e.g., the mouse cursor) to the X button of the web browser software application. As known to those skilled in the art, this action, when completed, typically results in termination of the communication session with the web server. Thus, as shown in FIG. 2A, the user has not completed making his tax payment and is attempting to terminate his communication session with the web server.

The present invention preferably recognizes that the web site visitor has attempted to terminate the online transaction with the tax payment web site. FIG. 2B illustrates an example of the present invention when transaction prompt 200 is invoked substantially automatically to inform the user that the transaction has been interrupted. As shown in the embodiment illustrated in FIG. 2B the user is prevented from terminating the communication session and a modified version of the display screen is provided. As shown in FIG. 2B, the same controls that were provided in FIG. 2A are provided in FIG. 2B (i.e., social security number, tax period, amount owed and current payment and, further, proceed to checkout button 2A08 is enabled such that the user can proceed with making his tax payment without interruption. In the event the user does not wish to proceed with his tax payment, the user can respond to prompts 2A10. For example, as shown in FIG. 2B, user can select a button to request never to be interrupted and bothered again, or can select a button requesting an e-mail reminder with a link to the site in a period of time, such as a week. Thus, in accordance with the example before and after embodiments shown in FIGS. 2A and 2B, in the event a user interrupts making a tax payment on an Internet web form, the termination itself is interrupted, and the user can continue with making the tax payment without further processing steps, and/or can respond to one or more prompts.

Figure 3A:
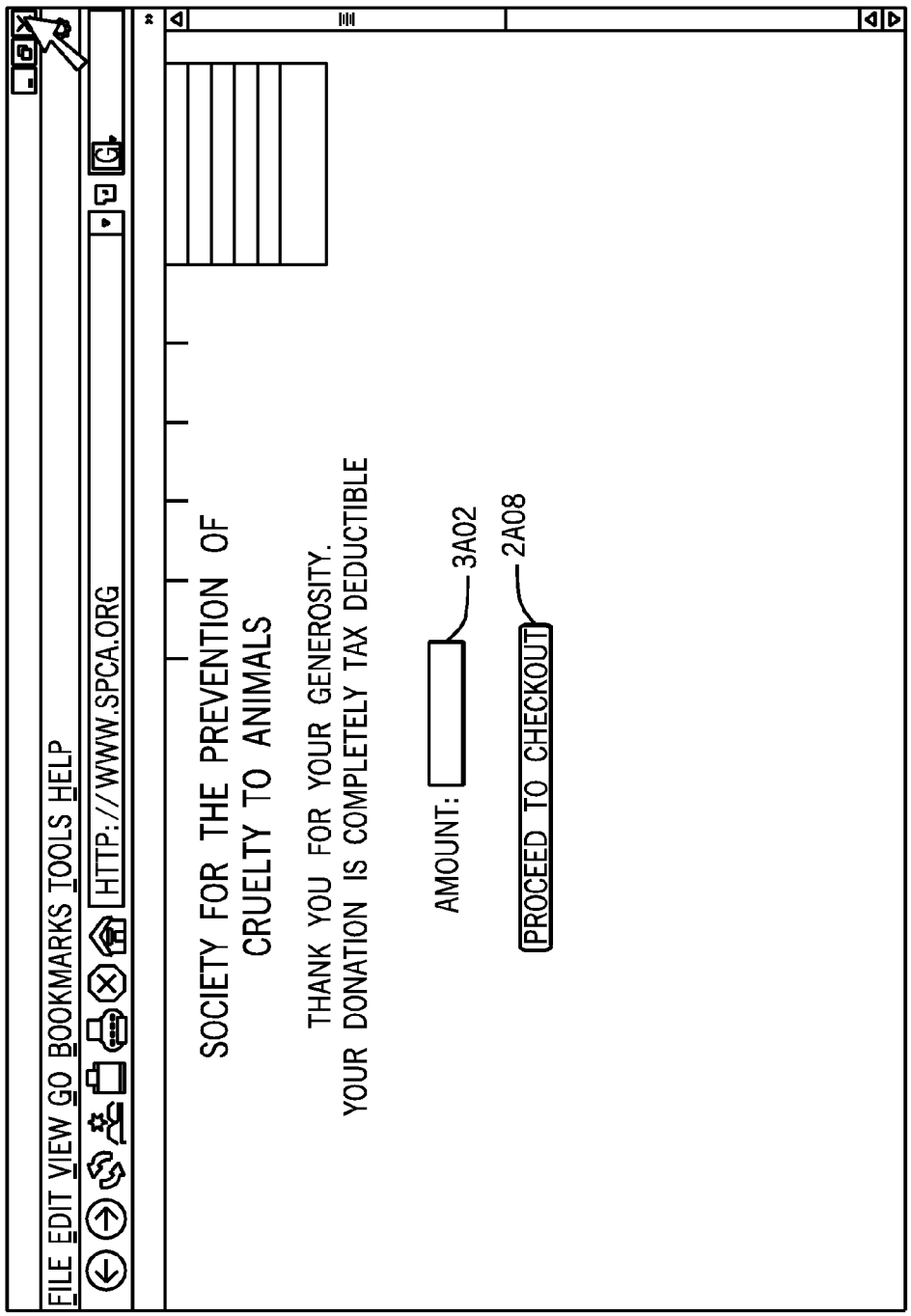

FIG. 3A illustrates an example embodiment in which a web site hosted by the Society for Prevention of Cruelty to Animals ("SPCA") is displayed. Thus, the online transaction displayed in FIG. 3A is a donation to the SPCA. The user is prompted in amount prompt 3A02 to identify an amount of payment that the user would like to donate to the SPCA. After specifying the amount, the user selects button 2A08 to make complete payment. In the example shown in FIG. 3A, the user has moved his pointer device over the X button in the upper right in an effort to terminate the session.

Figure 3B:
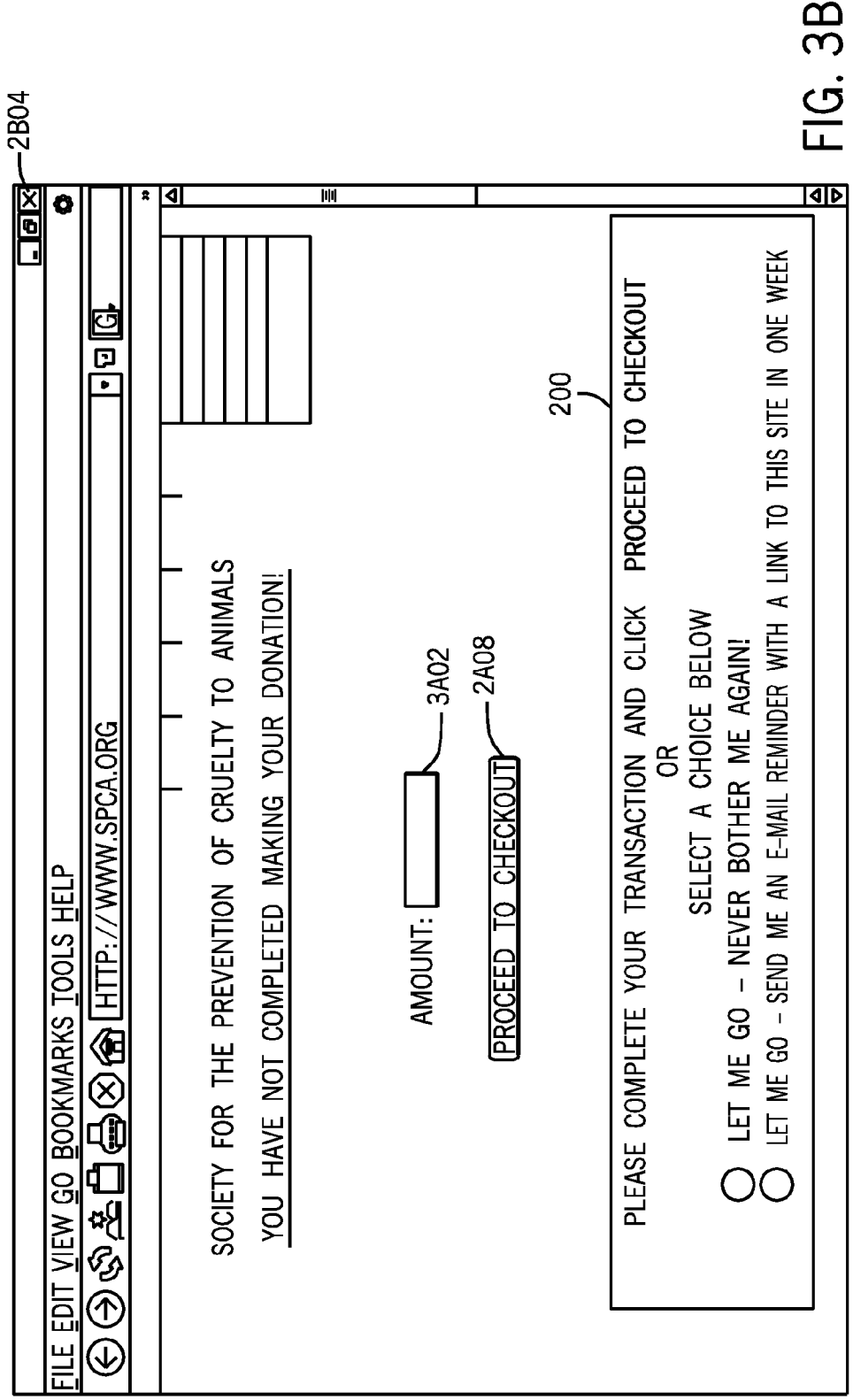

FIG. 3B continues with the example embodiment of the present invention of FIG. 3A in which the user is prompted to proceed with making his donation to the Society for the Prevention of Cruelty to Animals after his attempt to terminate the communication session with the web server is interrupted. Similar to the example shown in FIG. 2B, the user can proceed to checkout without further interruption, and/or can respond to one or more prompts. Transaction prompt 200 is preferably displayed in response to the user selecting a choice, such as WINDOWS X control box that would otherwise result in terminating the online transaction prior to the transaction being completed. Thus, in accordance with the example before and after embodiments shown in FIGS. 3A and 3B, after the user attempts to interrupt making a donation, the termination itself is interrupted, and the user is prompted to complete making his donation payment without further processing steps, and/or can respond to one or more prompts.

Figure 4A:
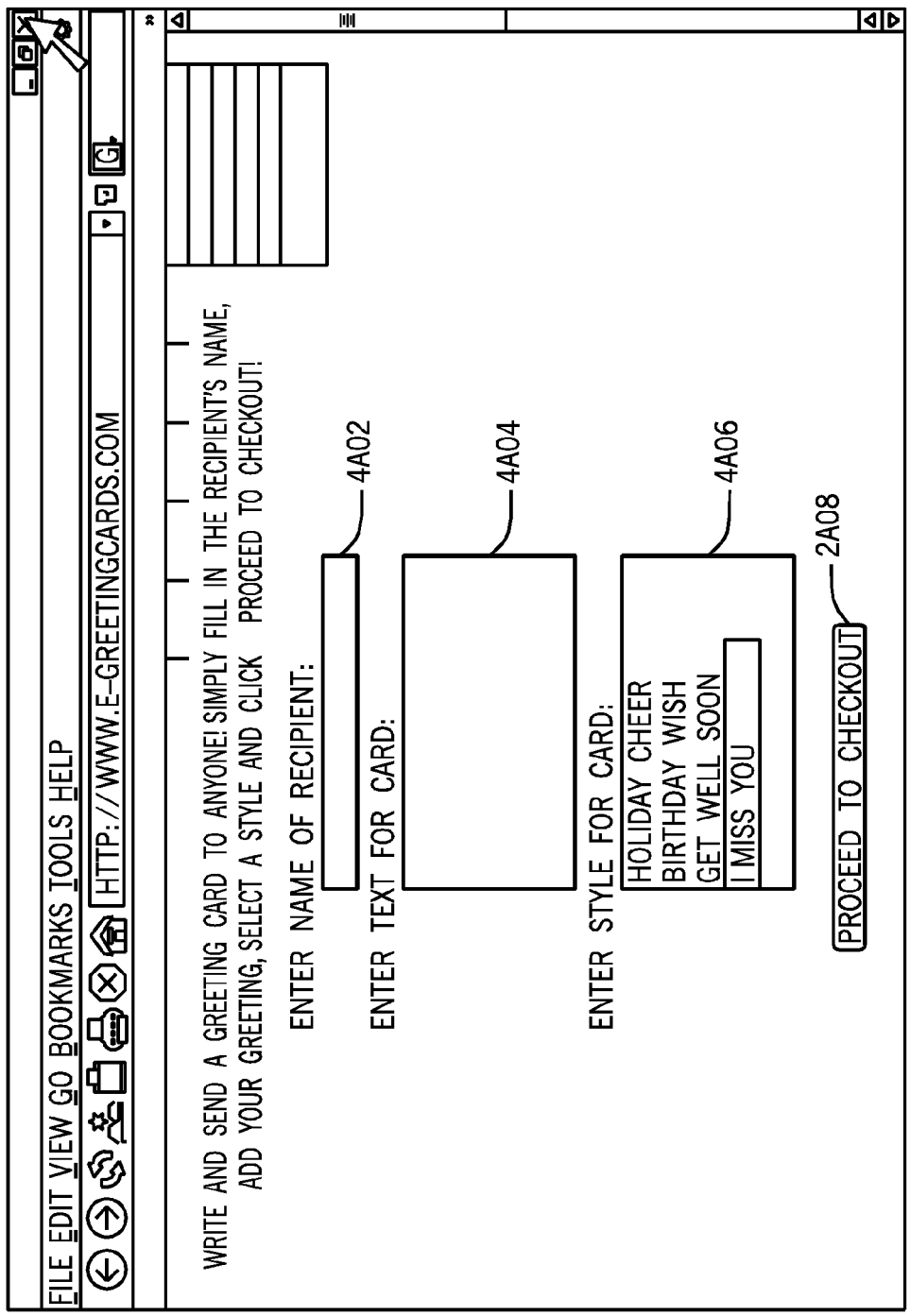

FIG. 4A illustrates an example embodiment in which electronic greeting cards (www.egreetingcards.com) web site is displayed to a user. Thus, the online transaction displayed in FIG. 4A is sending an e-greeting. The user identifies in control 4A02 the name of the recipient of the card, and, in graphic screen control 4A04, the visitor submits text that the user would like in the card to be displayed to the recipient. In control 4A06, the user selects a style for the greeting card. For example, the user selects whether the card is directed to a holiday, a birthday, a get well wish, or a simple "I Miss You" card. As indicated by the user moving his pointer device to the X button in the upper right portion of the display screen, the user is attempting to terminate the session prior to completing the online transaction.

Figure 4B:
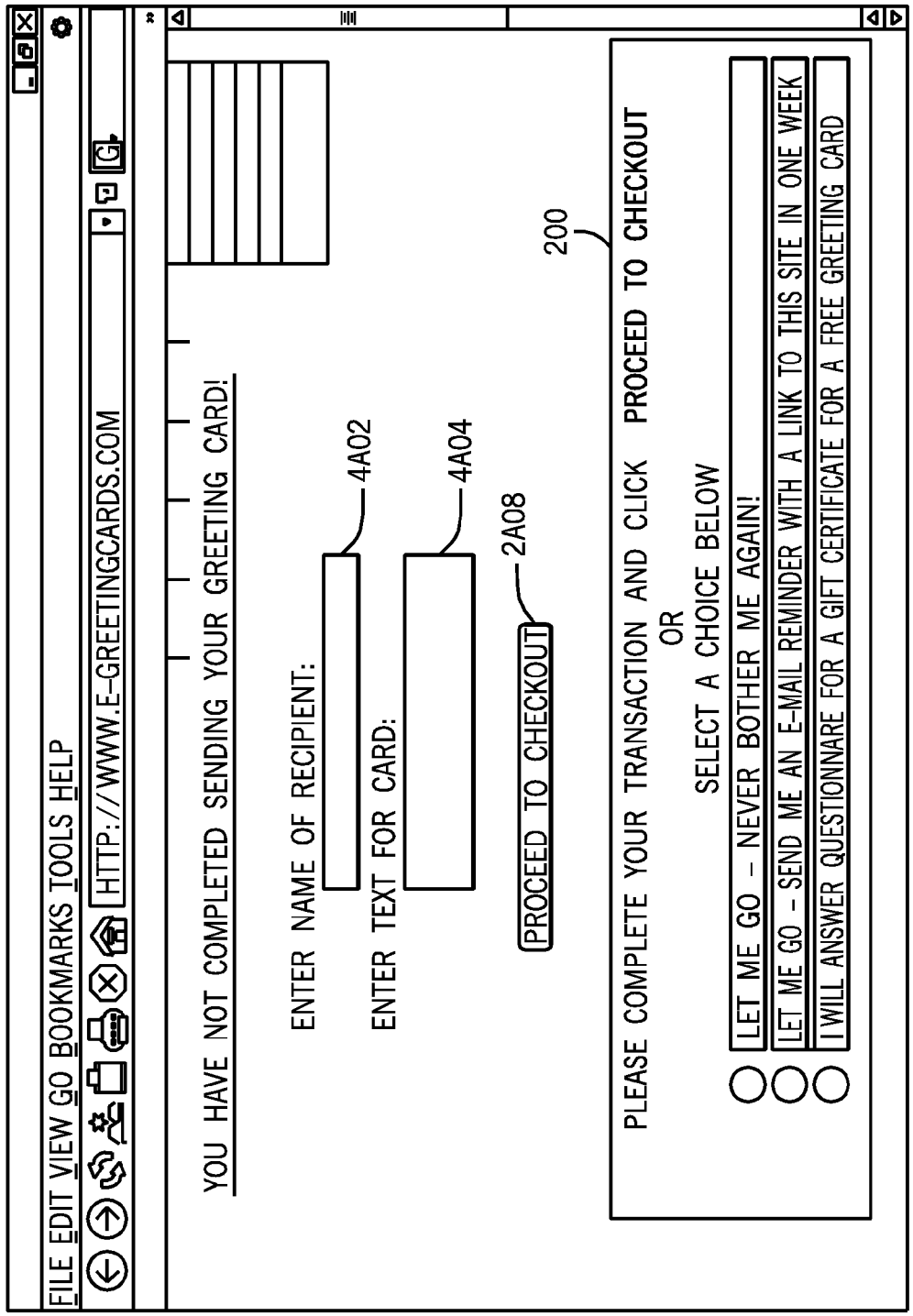

FIG. 4B continues the example embodiment shown in FIG. 4A in which the user's attempt to terminate the session with a web server is interrupted and the user is prompted to complete sending his greeting card. Transaction prompt 200 is preferably invoked and displayed after the user attempts to terminate the online transaction, thereby interrupting the online transaction prior to completion. Similar to the examples shown in FIGS. 2B and 3B, the user can complete his transaction and proceed to checkout without further interruption. Alternatively, the user can select from prompts to request never being bothered again, to request an e-mail reminder, or to answer a questionnaire for a guest certificate for a free greeting card. As shown in other embodiments herein, in return for responding to a questionnaire, a user can be provided some form of incentive, such as a gift certificate, a free gift, or in the example shown in FIG. 4B, a free greeting card. Thus, in accordance with the example before and after embodiments shown in FIGS. 4A and 4B, after the user attempts to send an electronic greeting card, the termination itself is interrupted, and the user is prompted to send his greeting card without having to take any further processing steps, and/or can respond to one or more prompts.

FIG. 5A illustrates an example informational web site display screen representing a fictitious organization, the National Garden Club (nationalgardenclub.com), and further represents an example registration display screen used by the visitor to receive informational content, such as a magazine subscription and various publications. Thus, the on-line transaction in FIG. 5A is subscribing to a magazine. In accordance with the example shown in FIG. 5A, the user submits information such as name, e-mail address, physical address and telephone number. The user further indicates the kind of subscription he would like, and also selects checkbox controls to identify various publications he is interested in receiving. As indicated by the pointing selector at the X button in the upper right portion of the display screen, the user is attempting to terminate the transaction prior to selecting Proceed to Checkout button 2A08 and completing the transaction.

Figure 5B:
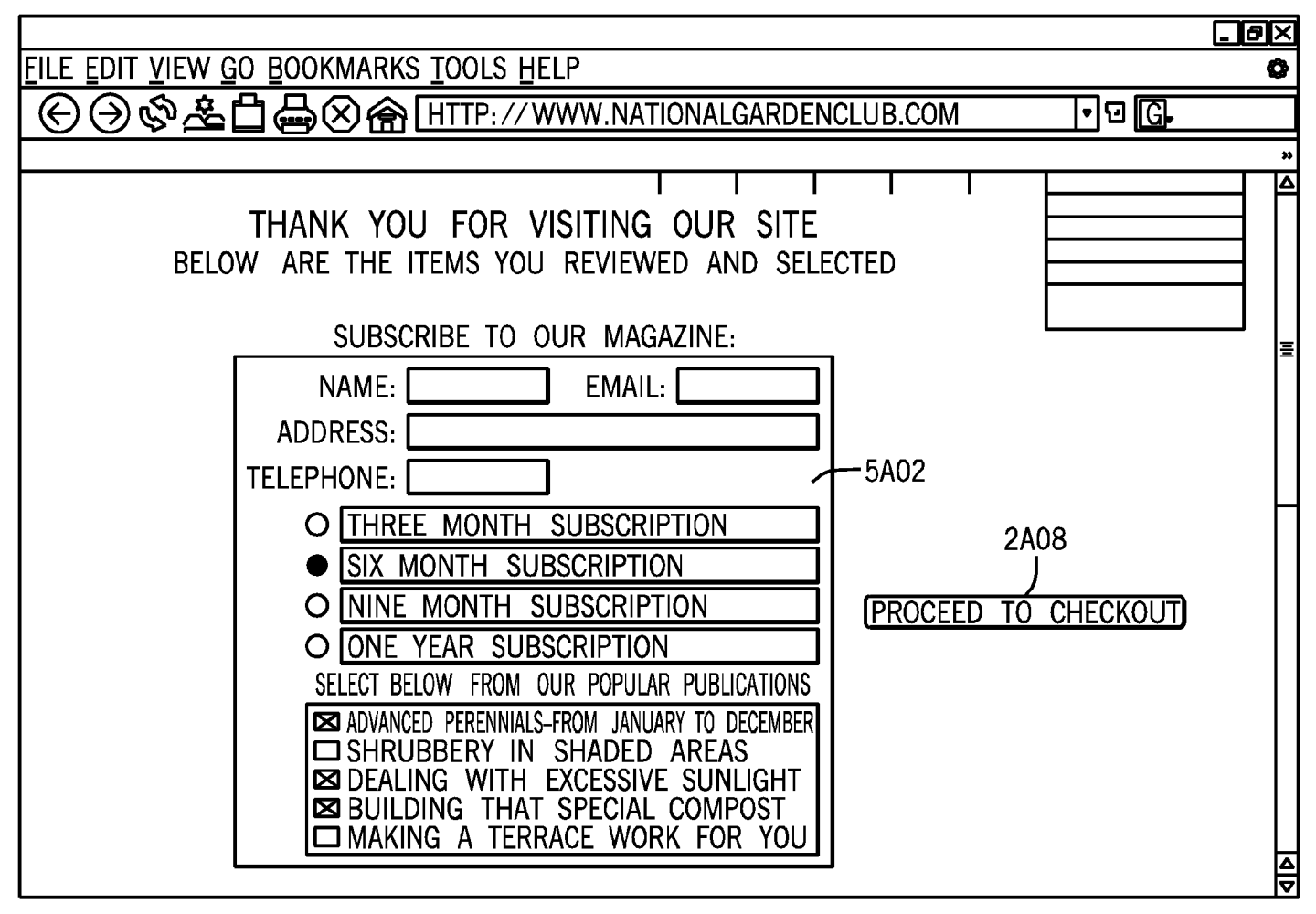

FIG. 5B shows an example embodiment of the present invention that appears after the user attempts to terminate the online transaction with the web site of the National Garden Club. Unlike the example embodiments shown in FIGS. 2B, 3B and 4B, however, the example embodiment shown in FIG. 5B provides no additional prompts (e.g., a request not to be interrupted again or a request for an e-mail reminded). Instead, a textual prompt is provided and formatted as a message thanking the user for visiting the web site, and identifying the items that were previously reviewed and selected in FIG. 5A. In the example shown in FIG. 5B, the user's previous choices indicating a request for a six month subscription and selection of three of five publications are provided. Further, in the example embodiment shown in FIG. 5B, the user can proceed to checkout via Proceed to Checkout button 2A08 without further interruption.

Figure 6:
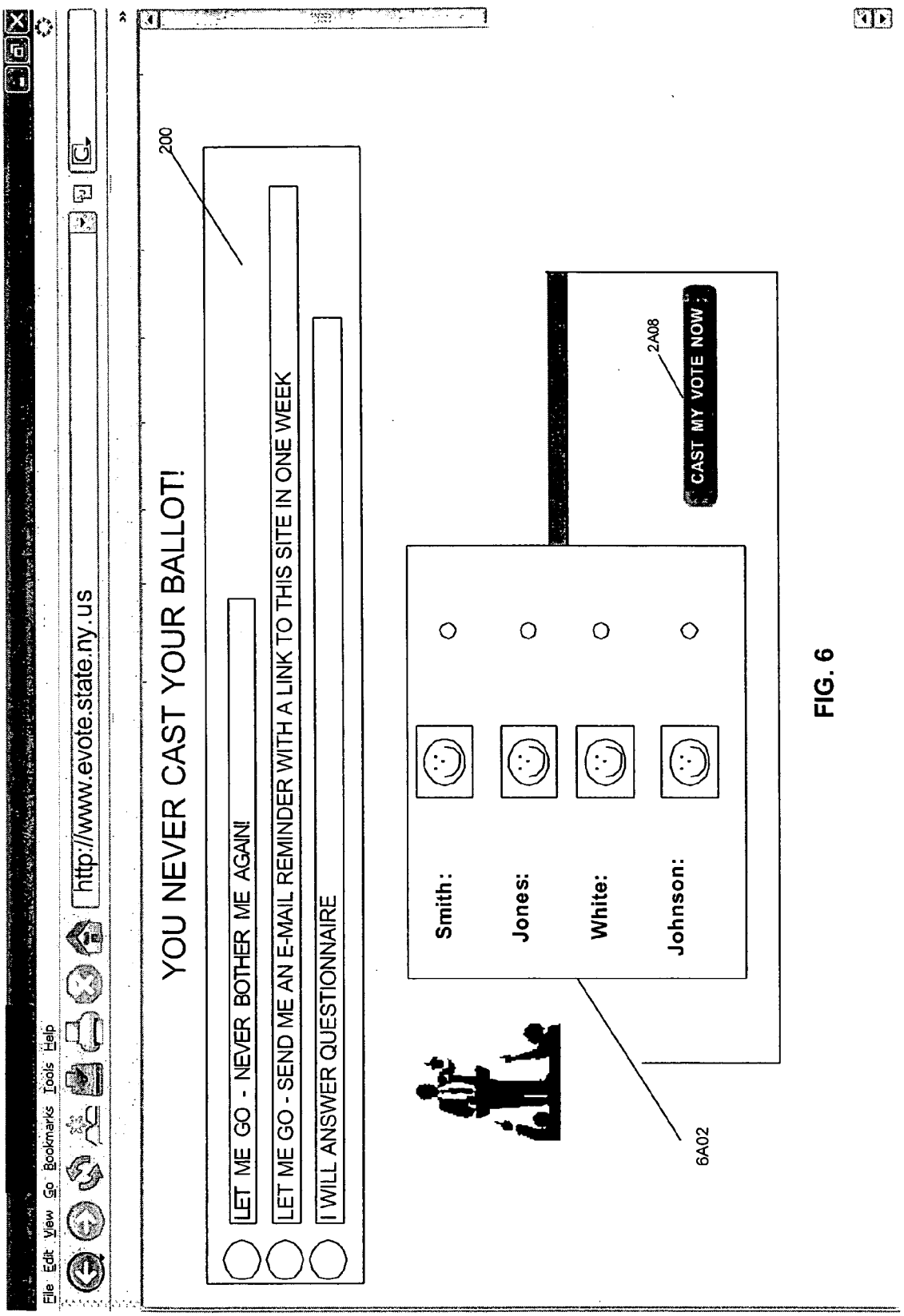

FIG. 6 illustrates an example embodiment of the present invention in which a web site visitor is using a web site display screen to cast a vote in a United States State Senate election. Thus, the online transaction in FIG. 6 is casting an election ballot. As shown in FIG. 6, the options for voting for a particular candidate is provided for the user to cast his vote. Also as shown in FIG. 6, transaction prompt 200 is displayed because the present invention has recognized that the visitor has attempted to terminate the online transaction prior to casting his vote for a candidate.

Figure 7:
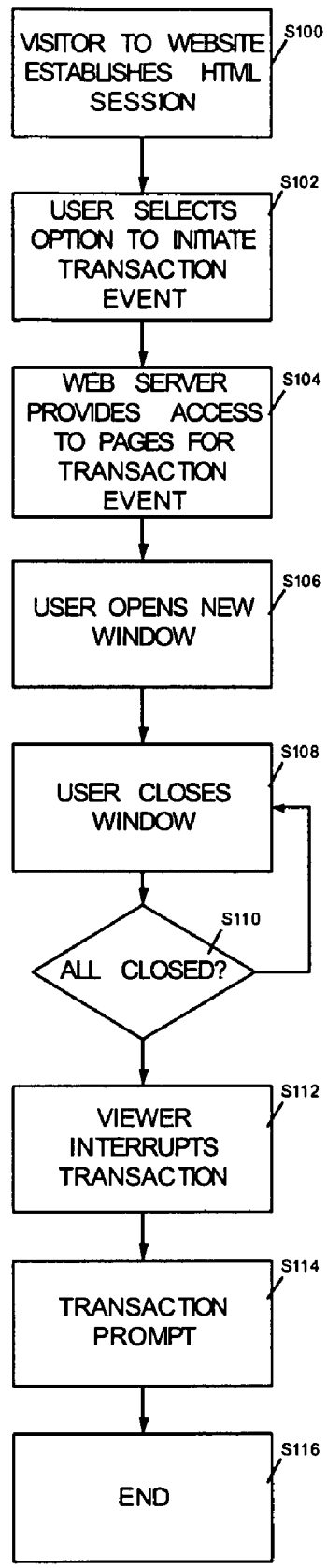
FIG. 7 is a flowchart that describes steps associated with providing a transaction prompt in response to interrupting an online transaction.

The present invention is now further described by way of example and reference to the flowchart illustrated in FIG. 7.

At step S100, a visitor to a web site establishes an HTTP session with a web site server. As described above, merely establishing an HTTP session with a web site server (i.e., by visiting a home page) is not considered, herein, to represent a transaction event. After the visitor reviews the home page, then, in step S104, the user makes a selection and the web site server provides access to the user which initiates a transaction event in accordance with the present invention. Thereafter, the user selects an option in step S106, the web site server provides access to pages for a user to make selections in order to complete the transaction event. Thereafter, at step S108, the user opens additional web site browser display screens are opened by the user who makes selections in the web site. For example, the web site displayed to the user is a web site for casting a ballot for a candidate running for political office. In an effort to learn more about the particular candidates, the user uses his mouse or other selection device and invokes a context sensitive menu (e.g., right mouse clicks) on a particular candidate and a second Internet web browser display screen appears with additional information regarding the candidate (step S108). Thereafter, the user decides not to cast a vote at this time and closes the web browser display screen that displays all of the candidates running for office (step S110). At that point, a determination is made, in step S12, whether all of the web browser display screens directed to the election are closed. In the present example, a web browser display screen is still active that provides additional information regarding the particular candidate the user requested information on. Therefore, the process loops back to step S110.

Continuing with the present example and with reference to the flowchart shown in FIG. 7, in step S110, the visitor to the online voting Internet web site closes the web browser display screen that provides information regarding a respective candidate. In step S112, a determination is made whether any web browser display screens are open that represent the transaction associated with casting a ballot for a candidate in an election. In step S114, the attempt to close the last display screen related to casting a ballot is viewed and/or interpreted as an interruption of the online transaction. After, transaction prompt 200 is displayed which enables the visitor to cast the ballot (step S16). Thus, the present invention makes a determination which web site display screen to display and, accordingly, provides information regarding the cast your ballot web page as opposed to the particular web page that shows a respective politician's agenda information. At step S118, the process ends. Thus as described above, the present invention determines when an online transaction is terminated and provides transaction prompt 200 in response.

Thus, the present invention provides solutions to shortcomings found in prior art e-commerce web sites. By providing a new layer of interaction with a visitor of an e-commerce web site, the likelihood of a sales transaction occurring on an e-commerce web site is significantly higher than that of prior art e-commerce web sites.

Figure 8:
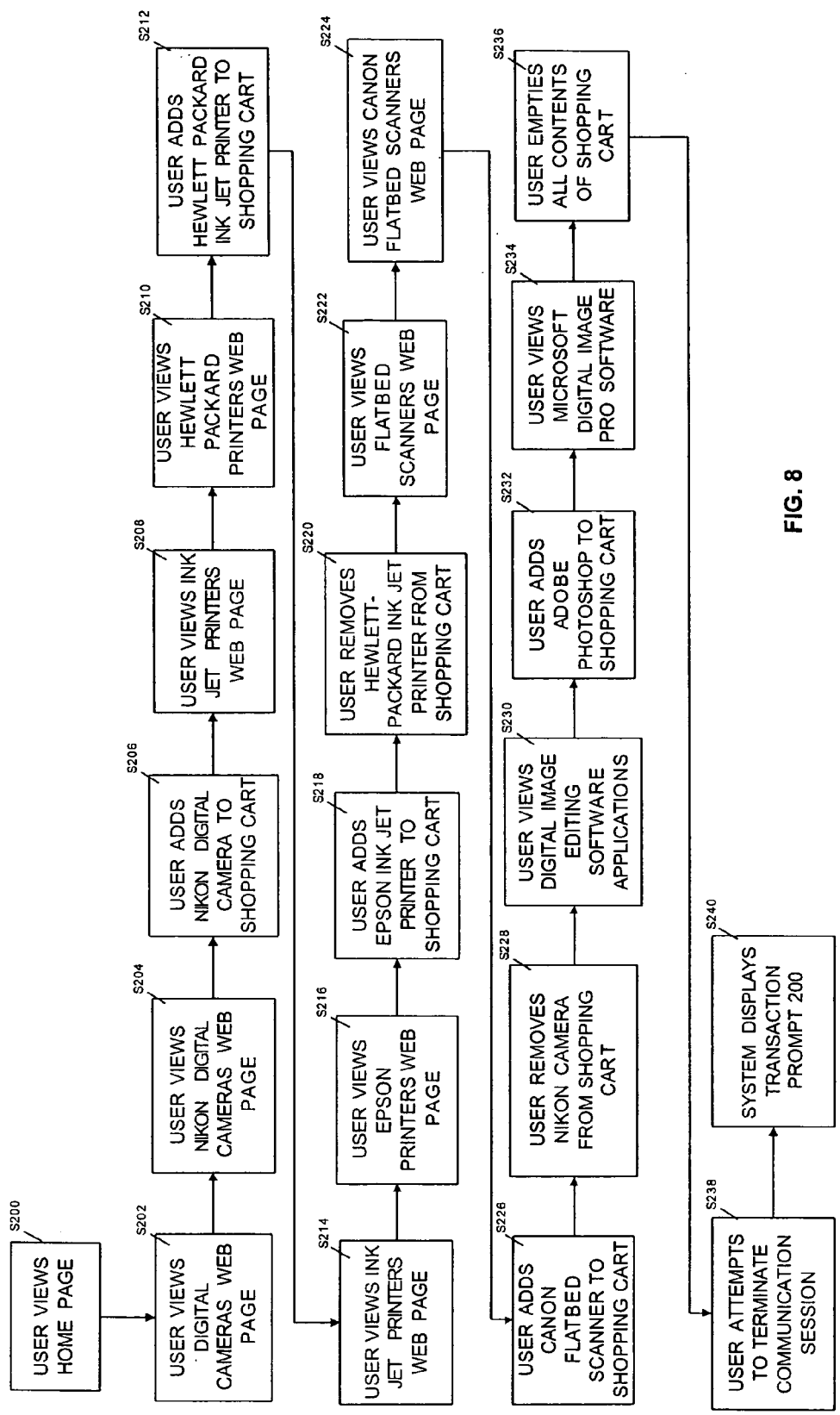
FIG. 8 is a flow chart that illustrates steps associated with using the present invention.

FIG. 8 is a flowchart that illustrates steps associated with a user making selections for purchasing items in an e-commerce web site, and a transaction prompt 200 that is provided by the present invention in response to the user attempting to terminate the communication session prior to completing the transaction. In step S200, the user views the home page of an e-commerce web site. For example purposes, the name of the web site is www.buytechnology.com. At step S202, the user navigates to digital cameras and views a digital camera web page. The digital camera's web page preferably provides images and details regarding various kinds of digital cameras. At step S204, the user views a web page directed to NIKON digital cameras and, at step S206, the user adds a NIKON digital camera to an e-commerce shopping cart provided on the web page.

Continuing with the current example, the user continues to shop at www.buytechnology.com, and views a web page directed to inkjet printers (step S208). The user navigates to a web page for HEWLETT PACKARD inkjet printers (step S210), and adds a HEWLETT PACKARD inkjet printer to the shopping cart in step S212.

Although the user has already added an inkjet printer to the shopping cart, the user has second thoughts and decides to view the web page directed to inkjet printers that was previously seen in step S208 (step S214). At step S216, the user decides to navigate to a web page showing EPSON printers, and at step S218, the user adds an EPSON inkjet printer to the shopping cart. At this point in time, the user has added a NIKON camera, a HEWLETT PACKARD printer and an EPSON printer to the shopping cart. Since the user does not desire to have two inkjet printers, the user, at step S220, removes the HEWLETT PACKARD inkjet printer from the shopping cart.

Continuing with the current example, the user navigates to a web page on www.buytechnology.com for flatbed scanners (step S222). At step S224, the user views a web page showing CANON flatbed scanners. The user adds a CANON flatbed scanner to the shopping cart. The contents of the shopping cart at this point in time now comprise a NIKON digital camera, an EPSON inkjet printer and a flatbed scanner. The user has decided at this point that he does not need a NIKON camera because he has elected to purchase a flatbed scanner.

Accordingly, at step S228, the user decides to remove the NIKON camera from the shopping cart. At step S230, the user views a web page directed to image editing software applications. Accordingly, at step S232, the user adds ADOBE PHOTOSHOP to the shopping cart. Having second thoughts about ADOBE PHOTOSHOP, for example with respect to the price, the user views another image editing software and, at step S234, the user views information regarding MICROSOFT DIGITAL IMAGE PRO software.

At step S236, the user has second thoughts about the entire purchase and decides to empty all of the shopping cart, such that the shopping cart has no contents. At step S238, the user decides to terminate the communication session with the web server and, at step S240, the present invention displays transaction prompt 200.

Figure 8A:
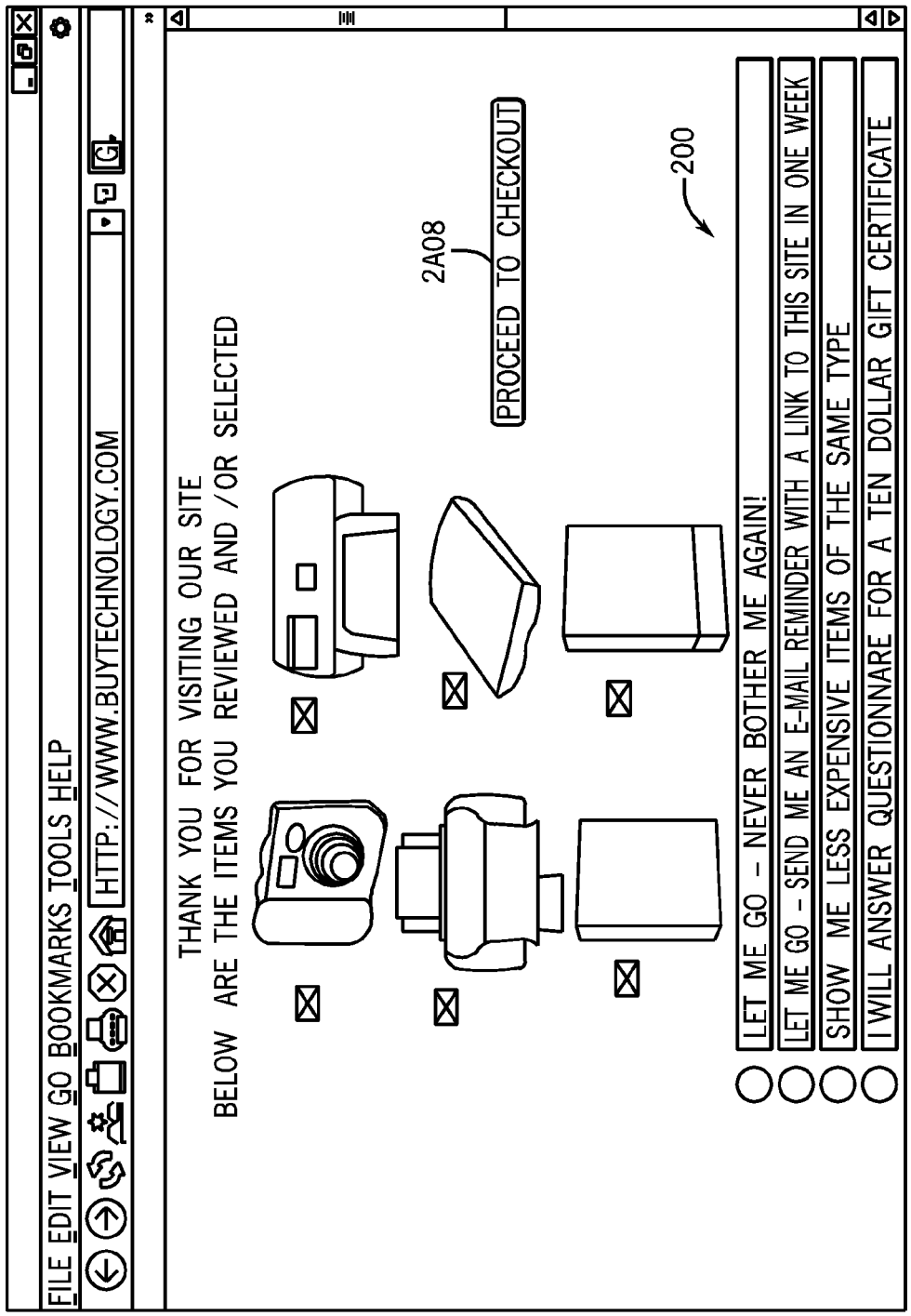
FIG. 8A is an example web display screen that illustrates an embodiment of the present invention.

FIG. 8A illustrates an example embodiment of the present invention that is provided that corresponds to step S240 shown in FIG. 8. In the example shown in FIG. 8A, the items that the user had reviewed and/or placed in the shopping cart are provided. For example, the contents of the web site shown in FIG. 8A include the NIKON digital camera, the CANON flatbed scanner, the HEWLETT PACKARD inkjet printer, the EPSON inkjet printer, MICROSOFT DIGITAL IMAGE PRO, and ADOBE PHOTOSHOP. Even though MICROSOFT DIGITAL IMAGE PRO was never formally added to the contents of the shopping cart, since the user reviewed a web page directed to MICROSOFT DIGITAL IMAGE PRO, the item is displayed for the user's review in FIG. 8A. Similar to the example shown in FIG. 5A, a prompt thanking the visitor for visiting the web site and a prompt indicating the items that were reviewed and selected is provided.

Further, as shown in previous examples of the present invention, a series of prompts are provided for the user for either requesting never to be bothered, sending an e-mail reminder to the web site in one week are provided for the user. Other prompts are also shown including a request to show less expensive items of the same type, and a selection for the user to answer a questionnaire for a $10.00 gift certificate. Of course, one skilled in the art will recognize that other forms of prompts can be provided to the user in transaction prompt 200. For example, the user may be prompted to review other sections of the web site that include similar items, a link that initiates a telephone call with a proprietor of the web site or the like. As shown in previous examples of the present invention, and as shown in FIG. 8A, the user can select one or more of the items displayed in order to continue shopping and proceed to checkout without further interruption. In the example shown in FIG. 8A, each item has a corresponding checkbox which the user can select or deselect to indicate he wishes to purchase the respective item(s).

Thus, the present invention makes it as easy as possible for the visitor to complete a purchase, and does not provide or introduce any barriers to completing a transaction.

In accordance with the teachings herein, the present invention provides an effective mechanism to ensure that on-line transactions are completed by users who accidentally or purposely attempt to terminate on-line transactions prior to completion. Users are provided with one or more prompts that enable the user to request to be left alone, to receive e-mail reminders, or to respond one a questionnaire. Moreover, the present invention enables users to complete on-line transactions conveniently and without further processing steps after an attempt to terminate an on-line transaction is interrupted. Furthermore, the present invention preferably monitors areas of web pages (or particular web pages) that were visited by a user and, when appropriate, identifies those areas so that the user can conveniently complete a transaction without further interruption.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A computer system comprising:
   a server, including a processor, configured to:
   receive a request to initiate an on-line transaction during a communication session;
   identify an attempt to terminate the communication session prior to completion of the on-line transaction;
   retain a selection associated with the communication session prior to the completion of the on-line transaction; and
   provide a notification in response to the identified attempt, wherein the notification comprises an indication of the selection made during the communication session prior to the completion of the on-line transaction and a prompt to complete the on-line transaction.

2. The computer system of claim 1, wherein the server is further configured to receive a response to the notification.

3. The computer system of claim 1, wherein the on-line transaction includes a purchase of a good or a service, a vote in an election, a request for information, a tax payment, a donation, or a registration.

4. The computer system of claim 1, wherein the notification further comprises a request for a reason for the attempt to terminate the communication session prior to completion of the on-line transaction.

5. The computer system of claim 4, wherein the server is further configured to receive a reply to the request for the reason, and provide a coupon redeemable for value in response to the reply to the request for the reason.

6. The computer system of claim 5, wherein the coupon comprises an alphanumeric code, a graphic, or a card.

7. The computer system of claim 1, wherein the notification includes a second prompt to terminate the communication session and to request a reminder to complete the on-line transaction.

8. The computer system of claim 7, wherein the reminder comprises one or more of a pop-up screen, a portion of a web page, a telephone call, an e-mail, or physical mail.

9. The computer system of claim 1, wherein the notification comprises a display screen that does not include a control to close the display screen.

10. The computer system of claim 1, wherein the server is configured to identify the attempt by identifying a pressing of a key on a keyboard or a clicking of a button on a pointing device.

11. The computer system of claim 10, wherein the pointing device is a trackball, a mouse, a trackpad, a touchscreen, a pointer, or a stylus.

12. The computer system of claim 1, wherein the on-line transaction is associated with an active web page of a plurality of web pages, and further wherein the server is configured to recognize that closing the active web page would result in incompletion of the on-line transaction.

13. The computer system of claim 1, wherein the server is configured to receive a request to initiate a second on-line transaction during the communication session, and wherein the notification further provides an opportunity to complete the second on-line transaction that has not been completed.

14. The computer system of claim 13, wherein the server is further configured to identify a second attempt to terminate a second communication session prior to completion of the second on-line transaction.

15. The computer system of claim 1, further comprising a database that stores a list of on-line transactions, wherein the list includes the on-line transaction.

16. The computer system of claim 15, wherein the server is further configured to display the list upon establishment of a subsequent communication session related to the on-line transaction.

17. A method comprising:
receiving, at a server including a processor, a request for initiating an on-line transaction during a communication session;
initiating, at the server, the on-line transaction;
identifying, at the server, an attempt to terminate the communication session prior to completion of the on-line transaction;
retaining, at the server, a selection associated with the communication session prior to the completion of the on-line transaction; and
providing, at the server, a notification in response to the identified attempt, wherein the notification comprises an indication of the selection made during the communication session prior to the completion of the on-line transaction and a prompt to complete the on-line transaction.

18. The method of claim 17, wherein the notification further comprises a request for a reason for the attempt to terminate the communication session.

19. The method of claim 17, wherein the notification further comprises an electronic questionnaire.

20. The method of claim 17, wherein the notification further comprises a second prompt to perform one or more of terminate the communication session, terminate the on-line transaction, or terminate the communication session and a request a reminder to complete the on-line transaction.

21. The method of claim 20, wherein the reminder is formatted as a pop-up screen, a displayed portion of a web page, a telephone call, an e-mail, or physical mail.

22. The method of claim 17, further comprising:
initiating a second on-line transaction, wherein the identified attempt to terminate the communication session is prior to completion of the second on-line transaction, and wherein the notification further includes a second prompt to complete the second on-line transaction.

23. The method of claim 22, further comprising receiving a selection of the first on-line transaction or the second on-line transaction in response to the notification.

24. The method of claim 17, wherein the on-line transaction comprises an interaction with a web site and is related to a service or a product.

25. The method of claim 17, wherein the notification further comprises a window operable to enable completion of the on-line transaction.

26. The method of claim 17, wherein the on-line transaction includes a purchase of a good or a service, a vote in an election, a request for information, a tax payment, a donation, or a registration.

27. A tangible computer-readable medium having stored thereon, computer-executable instructions that, if executed by a computing device, cause the computing device to perform a method comprising:
receiving a request to initiate an on-line transaction during a communication session;
identifying an attempt to terminate the communication session prior to completion of the on-line transaction;
retaining a selection associated with the communication session prior to the completion of the on-line transaction; and
providing a notification in response to the identified attempt, wherein the notification comprises an indication of the selection made during the communication session prior to the completion of the on-line transaction and a prompt to complete the on-line transaction.

28. The tangible computer-readable medium of claim 27, further comprising receiving a response to the notification, wherein the response comprises a completion of the on-line transaction.

29. The tangible computer-readable medium of claim 27, further comprising initiating the on-line transaction.

30. A computer system comprising:
means for receiving a request to initiate an on-line transaction during a communication session;
means for identifying an attempt to terminate the communication session prior to completion of the on-line transaction;
means for retaining a selection associated with the communication session prior to the completion of the on-line transaction; and
means for providing a notification in response to the identified attempt, wherein the notification comprises an indication of the selection made during the communication session prior to the completion of the on-line transaction and a prompt to complete the on-line transaction.

31. The computer system of claim 30, wherein the notification further comprises a request for a reason for the attempt to terminate the communication session prior to completion of the on-line transaction.

32. The computer system of claim 31, further comprising:
means for receiving a reply to the request for the reason; and
means for providing a coupon redeemable for value in response to the reply to the request for the reason.

* * * * *